UNITED STATES PATENT OFFICE.

GEORGE T. LEWIS, OF PHILADELPHIA, PENNSYLVANIA.

IMPROVEMENT IN THE MANUFACTURE OF ACETATE OF ALUMINA.

Specification forming part of Letters Patent No. 59,238, dated October 30, 1866.

*To all whom it may concern:*

Be it known that I, GEORGE T. LEWIS, of the city and county of Philadelphia, in the State of Pennsylvania, have invented a new and useful Mode of Manufacturing Acetate of Alumina; and I do hereby declare that the following is a full and exact description of the same.

I employ the alumina obtained from the mineral known as "cryolite." The alumina may be in either a powder or pulp state; but I prefer to use the pulp as produced in the process of its extraction from the mineral. To this pulp I add acetic acid, pure or impure, in sufficient quantity to produce an acetate of alumina.

I use about two and a half to three pounds of acetic acid, calculated dry, to one pound of alumina, calculated dry. I stir the acid and the alumina well together, employing heat to facilitate the solution; then allow the mixture to settle, and decant or filter off the acetate.

Having thus described my invention, I claim and desire to secure by Letters Patent—

The manufacture of acetate of alumina by mixing the alumina extracted from cryolite with acetic acid, substantially as described.

GEORGE T. LEWIS.

Witnesses:
 J. E. SHAW,
 GEO. BUCKLEY.